US011035396B2

(12) United States Patent
Jung

(10) Patent No.: US 11,035,396 B2
(45) Date of Patent: Jun. 15, 2021

(54) TUBE LOCKING DEVICE FOR FIRE SUPPRESSION SYSTEM

(71) Applicant: SEUNGJIN IND. CO., LTD, Gyeonggi-do (KR)

(72) Inventor: Woon Taek Jung, Gyeonggi-do (KR)

(73) Assignee: SEUNGJIN IND. CO., LTD ( * ) Notice: Subject to any disclaimer, the term of this patent is extended or adjusted under 35 U.S.C. 154(b) by 149 days.

(21) Appl. No.: 16/174,920

(22) Filed: Oct. 30, 2018

(65) Prior Publication Data

US 2019/0128299 A1 May 2, 2019

(30) Foreign Application Priority Data

Nov. 1, 2017 (KR) .......................... 10-2017-0144524
Jan. 24, 2018 (KR) .......................... 10-2018-0008759

(51) Int. Cl.
F16B 7/04 (2006.01)
F16L 3/12 (2006.01)
F16L 55/035 (2006.01)
A62C 35/68 (2006.01)

(52) U.S. Cl.
CPC .............. F16B 7/0493 (2013.01); F16L 3/12 (2013.01); F16L 55/035 (2013.01); A62C 35/68 (2013.01); F16L 3/1222 (2013.01)

(58) Field of Classification Search
CPC ....... F16B 7/0493; F16B 2/185; F16L 55/035; F16L 3/12; F16L 3/1222; A62C 35/68
USPC ................................. 248/200.1, 342, 343, 75
See application file for complete search history.

(56) References Cited

U.S. PATENT DOCUMENTS

| 5,622,341 | A | * | 4/1997 | Stana | F16L 3/222 |
| | | | | | 248/74.1 |
| 8,833,718 | B2 | * | 9/2014 | Oh | F16L 3/245 |
| | | | | | 248/343 |
| 9,004,422 | B2 | * | 4/2015 | Feenstra | E04B 9/006 |
| | | | | | 248/200.1 |
| 9,308,407 | B2 | * | 4/2016 | Jung | F16L 3/1075 |
| 9,341,286 | B1 | * | 5/2016 | Oh | A62C 35/00 |
| 9,731,156 | B2 | * | 8/2017 | Jung | F16B 2/10 |
| 2011/0155865 | A1 | * | 6/2011 | Oh | A62C 35/68 |
| | | | | | 248/67.7 |
| 2013/0048822 | A1 | * | 2/2013 | Liu | A62C 35/68 |
| | | | | | 248/316.5 |
| 2014/0360737 | A1 | * | 12/2014 | Kim | F16L 3/00 |
| | | | | | 169/51 |

(Continued)

Primary Examiner — Muhammad Ijaz
(74) Attorney, Agent, or Firm — Mendelsohn Dunleavy, P.C.

(57) ABSTRACT

A tube locking device for a fire suppression system according to the present invention includes: a tube receiving module including opposite tube receiving parts facing each other, connection parts provided on sides of the tube receiving parts so as to connect the tube receiving parts, and rotation induction parts provided between the connection parts by protruding from the tube receiving parts; and a tube fastening module including a tunnel housing provided between the rotation induction parts, the tunnel housing being elastically fixed to the rotation induction parts while rotating relative to the rotation induction parts, a press part protruding from a first end part of the tunnel housing, and a handle part protruding from a second end part of the tunnel housing.

32 Claims, 13 Drawing Sheets

(56) References Cited

U.S. PATENT DOCUMENTS

| | | | |
|---|---|---|---|
| 2015/0060613 A1* | 3/2015 | Lim | F16B 2/185 248/75 |
| 2015/0377386 A1* | 12/2015 | Mitchell | A62C 35/68 169/51 |
| 2016/0199680 A1* | 7/2016 | Jung | A62C 35/68 248/75 |
| 2018/0259094 A1* | 9/2018 | Jung | F16L 3/1075 |
| 2019/0128299 A1* | 5/2019 | Jung | F16L 55/035 |
| 2019/0271413 A1* | 9/2019 | Jung | A62C 35/68 |

* cited by examiner

TUBE LOCKING DEVICE FOR FIRE SUPPRESSION SYSTEM

CROSS REFERENCE TO RELATED APPLICATION

The present application claims priority to Korean Patent Application Nos. 10-2017-0144524 and 10-2018-0008759, filed on Nov. 1, 2017 and Jan. 24, 2018, respectively, the entire contents of which is incorporated herein for all purposes by this reference.

BACKGROUND OF THE INVENTION

Field of the Invention

The present invention generally relates to a fire suppression system, wherein a sprinkler for discharging fire suppression water supplied through a fire suppression pipe during a fire occurrence in a building is fixed at a predetermined position.

Description of the Related Art

In recent years, fire services act applies seismic design criteria of fire suppression facilities to buildings so as to protect the lives and properties of residents and workers from a fire by preventing, warning, and suppressing a fire due to natural disasters, earthquakes, or volcanic activities. The seismic design criteria requires mounting a sprinkler mounting instrument to a support supported by a building so as to minimize the movement of a sprinkler in the building due to vibration of a fire suppression pipe of a building during a natural disaster.

In this case, the sprinkler mounting instrument allows a reducer positioned on the sprinkler to contact with the support so as to indirectly mount the sprinkler to the support. Meanwhile, the sprinkler mounting instrument is disclosed as a conventional art titled "Sprinkler reducer mounting apparatus" in Korean Utility Model Registration No. 20-0392716. The sprinkler reducer mounting apparatus is composed of a fixing bracket, a reducer, and a support. The fixing bracket has two fixing plate parts provided thereon by being bent on a center area of an oval plate, the fixing plate parts being opposed to each other.

The reducer passes through the two fixing plate parts, and the support is positioned between the two fixing plate parts so as to intersect with the reducer. Here, the sprinkler reducer mounting apparatus is configured to bring the support into close contact with the reducer between the two fixing plate parts by pushing the support via at least one wing bolt inserted into a center of the fixing bracket. However, due to the ring-shaped structure of the reducer, the close contact force of the support with the reducer on areas of the support is not steady depending on the number of the at least one wing bolt used.

In addition, as the number of the bolts used increases, the wing bolts transforms an initial shape of the support and increases working time, which deteriorates working conditions.

SUMMARY OF THE INVENTION

Accordingly, the present invention has been made keeping in mind the above problems occurring in the related art, and the present invention is intended to propose a tube locking device for a fire suppression system, wherein the tube locking device prevents the idle-rotating of a reducer due to ring-shaped outer surfaces of the reducer, increases a close contact force of a support tube with narrow areas of the ring-shaped outer surfaces of the reducer so as to prevent an initial shape of the support tube from being deformed, and minimizes working time by using a one-touch method.

In order to achieve the above object, according to one aspect of the present invention, there is provided a tube locking device for a fire suppression system, the tube locking device including: a tube receiving module including opposite tube receiving parts facing each other, connection parts provided on sides of the tube receiving parts so as to connect the tube receiving parts, and rotation induction parts provided between the connection parts by protruding from the tube receiving parts; and a tube fastening module including a tunnel housing provided between the rotation induction parts, the tunnel housing being elastically fixed to the rotation induction parts while rotating relative to the rotation induction parts, a press part protruding from a first end part of the tunnel housing, and a handle part protruding from a second end part of the tunnel housing, wherein the tube receiving parts are passed through by a reducer positioned at a flow path of fire suppression water in an inner part of a building, are fixed to the building, and sandwich a support tube intersecting with the reducer in the vicinity of the reducer, and when the tunnel housing is elastically fixed to the rotation induction parts, the press part brings the support tube into close contact with the reducer by pushing the support tube elastically toward the reducer in the vicinity of the rotation induction parts.

The tube receiving parts may include opposite semielliptical plates that have receiving holes provided at predetermined areas of the semielliptical plates and at least two wing pieces provided in the vicinity of each of the receiving holes, wherein the at least two wing pieces may surround the receiving hole.

Each of the opposite semielliptical plates may have a circular arc shape provided on a first side edge thereof and a straight shape provided on a second side edge thereof, wherein the tube receiving parts may be connected to each other by the connection parts protruding in parallel from opposite edges of the semielliptical plates on second side edges thereof.

The receiving hole of each of the semielliptical plates may have edges matching angular outer surfaces of a ring shape of the reducer so as to insert the reducer into the receiving hole.

The at least two wing pieces may protrude from each of the semielliptical plates toward an outside of each of the tube receiving parts from an inside thereof so as to prevent an idle-rotating of the reducer by being in contact with the reducer inserted into the receiving hole.

Each of the semielliptical plates further may include surface-elasticity-maintaining grooves positioned on opposite sides of the receiving hole, wherein the surface-elasticity-maintaining grooves may extend in predetermined widths from the opposite sides of the receiving hole toward a straight shape of the semielliptical plate and protrude from an inner circumferential surface of the semielliptical plate toward an outer circumferential surface thereof.

Each of the connection parts may include a joining member and an isolation groove, wherein the joining member and the isolation groove may extend or be provided in directions opposite to each other relative to the semielliptical plate.

The joining member may have a flat surface between the tube receiving parts and be bent to be curved from the semielliptical plate so as to give elasticity to the semielliptical plate.

The joining member may include an elasticity operation hole defined between the tube receiving parts so as to give elasticity to the tube receiving parts.

The isolation groove of each of the connection parts may extend from the second side edge of the semielliptical plate toward the receiving hole between each of the connection parts and the rotation induction parts so as to allow the movement of the rotation induction parts independent from the connection parts.

Each of the rotation induction parts may include a hinge hole and a fixing hole defined thereon between the connection parts, constitute the same surface as each of the tube receiving parts, and have a guide groove provided above the fixing hole, the guide groove being open toward an area positioned between the rotation induction parts.

The hinge hole and the fixing hole of each of the rotation induction parts may be positioned at levels higher than levels of the connection parts.

The hinge hole of the rotation induction parts may be positioned at a level higher than a level of the fixing hole.

Each of the rotation induction parts may include a locking part and a hinge part provided thereon between the connection parts, wherein the locking part and the hinge part may include a locking hole and a hinge hole defined respectively thereon.

The locking part may protrude vertically from a straight shape of each of the semielliptical plates to an outside of the semielliptical plate.

The locking part may include a sliding groove provided on an upper side thereof and the locking hole provided on a lower side thereof, wherein the sliding groove and the locking hole may be slanted relative to a straight shape of each of the semielliptical plates, and the locking hole of the locking part may extend from the locking part to the semielliptical plate.

The hinge part may protrude vertically from a straight shape of each of the semielliptical plates to the outside of the semielliptical plate and may be higher than the locking part relative to the straight shape of the semielliptical plate.

When the tunnel housing is elastically fixed to the rotation induction parts, the tunnel housing may include a tunnel locking member in a U shape so as to be open toward inner parts of the tube receiving parts, wherein when the tunnel locking member is elastically fixed to each of the rotation induction parts, the tunnel locking member may intersect with open directions of the hinge hole and the fixing hole of each of the rotation induction parts so as to be exposed to each of the rotation induction parts.

The tunnel locking member may include a through hole 140 defined on each of opposite side walls thereof, the through hole being arranged so as to correspond to the hinge hole of each of the rotation induction parts, wherein the tunnel locking member and each of the rotation induction parts may be rotatably fixed to each other by the hinge pin inserted into the through hole and the hinge hole.

The tunnel locking member may include: two separating grooves defined on each of opposite side walls thereof in a direction perpendicular to a thickness direction of each of the opposite side walls; and a corrugated finishing member arranged between the two separating grooves on each of the opposite side walls so as to be combined with the fixing hole of each of the rotation induction parts, wherein the corrugated finishing member may include a corrugated protrusion provided thereon by protruding from the corrugated finishing member toward each of the rotation induction parts, the corrugated protrusion being inserted into the guide groove of each of the rotation induction parts and sliding along each of the rotation induction parts from the guide groove toward the fixing hole so as to be elastically fixed to the fixing hole.

When the tunnel housing is elastically fixed to the rotation induction parts, the tunnel housing may include a tunnel locking member in a U shape so as to be open toward the tube receiving parts, wherein when the tunnel locking member is elastically fixed to each of the rotation induction parts, the tunnel locking member may intersect with open directions of the hinge hole and a fixing hole of each of the rotation induction parts so as to be exposed to each of the rotation induction parts.

The tunnel locking member may include a through hole defined thereon, wherein when the tunnel locking member covers the locking part and the hinge part and is open toward the locking part and the hinge part while passing an insertion hole positioned between the tube receiving parts, the through hole may be combined with the hinge hole of the hinge part on an outer circumferential surface of the semielliptical plate by a hinge pin.

The tunnel locking member may include: two separating grooves defined slantingly on each of opposite side walls thereof in a direction perpendicular to a thickness direction of each of the opposite side walls; and a corrugated finishing member arranged between the two separating grooves, the corrugated finishing member passing the sliding groove of the locking part on an outer circumferential surface of the semielliptical plate and being combined with the locking hole positioned under the sliding groove, wherein when the locking part and the tunnel locking member are combined with each other, the corrugated finishing member may cover the sliding groove and the locking hole, be slanted to the straight shape of the semielliptical plate, and allow a corrugated protrusion to be inserted into the locking hole.

The press part may include a press piece provided thereon in such a manner that the press piece protrudes from an upper side of a first side tunnel entrance of the tunnel locking member, surrounds the first side tunnel entrance, is bent toward a lower side of the first side tunnel entrance, and is exposed to the lower side of the first side tunnel entrance, wherein when the tunnel locking member is elastically fixed to each of the rotation induction parts, the press piece may vibrate elastically through the lower side of the tunnel locking member between the opposite side walls of the tunnel locking member.

The press piece may have the press protrusion provided on a surface opposite to a surface facing an inner part of the tunnel locking member, wherein when the tunnel locking member is elastically fixed to each of the rotation induction parts, the press part may press the support tube between the rotation induction parts via the press protrusion of the press piece.

The press part may include a first press piece and a second press piece, wherein the first press piece and the second press piece may face an outer circumferential surface and an inner circumferential surface of the semielliptical plate respectively.

The second press piece may be positioned to be spaced apart from the receiving hole of the semielliptical plate or to be adjacent thereto by a relative rotation of the tunnel housing relative to the hinge part, wherein when the second press piece is spaced apart from the receiving hole of the semielliptical plate, the second press piece may move toward the locking part so as to be adjacent thereto, and when the second press piece is positioned to be adjacent to the receiving hole of the semielliptical plate, the tunnel housing may be combined with the locking part.

After the locking part and the tunnel housing are combined with each other, the second press piece extending horizontally along a lower part of the tunnel locking member so as to have an arm shape after protruding vertically from an edge of a first side of the tunnel locking member toward the receiving hole of the semielliptical plate may expose a corrugated surface of the second press piece to an entrance of the receiving hole of the semielliptical plate and contact with the reducer positioned in the receiving hole of the semielliptical plate via the corrugated surface.

After the locking part and the tunnel housing are combined with each other, the first press piece may be configured to be integrated with the tunnel locking member between the tube receiving parts, wherein the first press piece may protrude from a ceiling of the tunnel locking member, be bent to have a round shape in the vicinity of the hinge part, extend horizontally toward the locking part, expose the press protrusion toward the receiving hole of the semielliptical plate in the vicinity of the locking part and the hinge part, and contact with the support tube positioned in the vicinity of the receiving hole of the semielliptical plate via the press protrusion.

The handle part may include a pushing member provided thereon by protruding slantingly from an upper side of a second side tunnel entrance of the tunnel locking member, wherein when the tunnel locking member is elastically fixed to each of the rotation induction parts, the pushing member may receive a force from outside and apply the force to the tunnel locking member and the press piece.

According to the present invention, the tube locking device for a fire suppression system includes the opposite tube receiving parts provided in the tube receiving module and the receiving hole and the wing pieces provided on the semielliptical plate of each of the tube receiving parts, whereby the tube locking device allows the receiving hole and the wing pieces to sufficiently match the angular outer surfaces of a ring shape of the reducer, thereby efficiently responding to the angular outer surfaces of a ring shape of the reducer via the semielliptical plate so as to prevent an idle-rotating of the reducer relative to the semielliptical plate during shaking of a building.

According to the present invention, the tube locking device for a fire suppression system includes the tube fastening module being elastically fixed to the tube receiving module, the reducer and the support tube provided in the tube receiving parts of the tube receiving module, the reducer and the support tube intersecting with each other, and the press piece provided on the tunnel housing of the tube fastening module, the press piece elastically vibrating, whereby the tube locking device allows press protrusions of the press piece to contact with the support tube between the tube receiving parts and increases a close contact force of the support tube with one angular surface of the angular outer surfaces of a ring shape of the reducer, thereby preventing an initial shape of the support tube from being defamed.

According to the present invention, the tube locking device for a fire suppression system includes the tube fastening module elastically fixed to the tube receiving module, the reducer and the support tube provided in each of the tube receiving parts of the tube receiving module, the reducer and the support tube intersecting with each other, and the first press piece and the second press piece provided on the tunnel housing of the tube fastening module, the first press piece and the second press piece elastically vibrating, whereby the tube locking device allows the press protrusion of the first press piece to contact with the support tube between the tube receiving parts and a corrugated surface of the second press piece to contact with the reducer outside of each of the tube receiving parts, and thus increases a close contact force of the support tube with the angular outer surfaces of a ring shape of the reducer, thereby preventing an initial shape of the support tube from being defamed.

According to the present invention, the tube locking device for a fire suppression system includes the tube fastening module rotating relative to the tube receiving module, the tube receiving parts and the two rotation induction parts arranged in order on the tube receiving module, and the tunnel locking member provided on the tunnel housing of the tube fastening module, whereby the tube locking device allows the tunnel locking member to rotate in a one-touch method in the vicinity of the two rotation induction parts so as to easily bring the reducer and the support tube introduced into the tube receiving parts into close contact with each other, thereby minimizing working time required in the combination of the support tube with the reducer via the tube fastening module.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
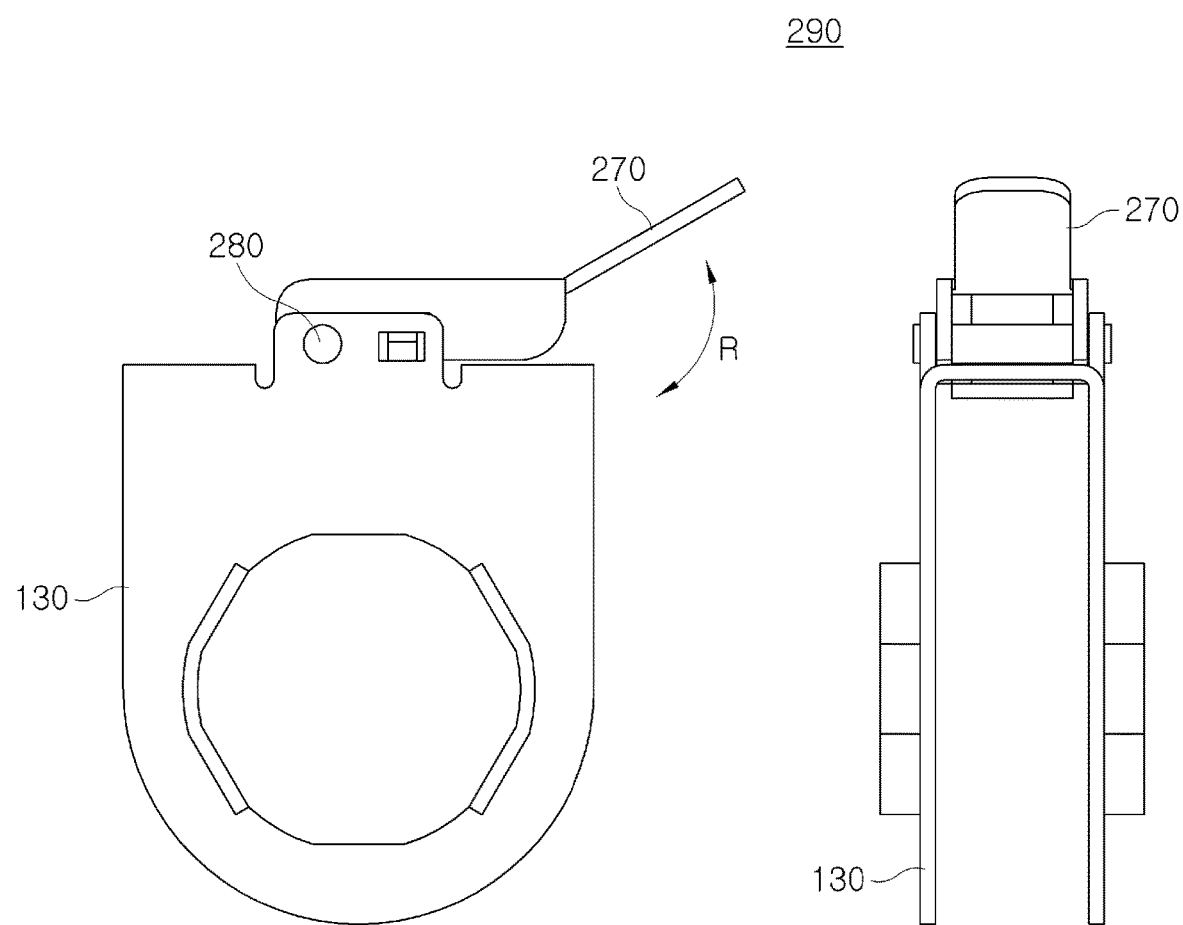
FIG. 1 shows views roughly showing a tube locking device for a fire suppression system according to a first embodiment of the present invention.
Figure 2:
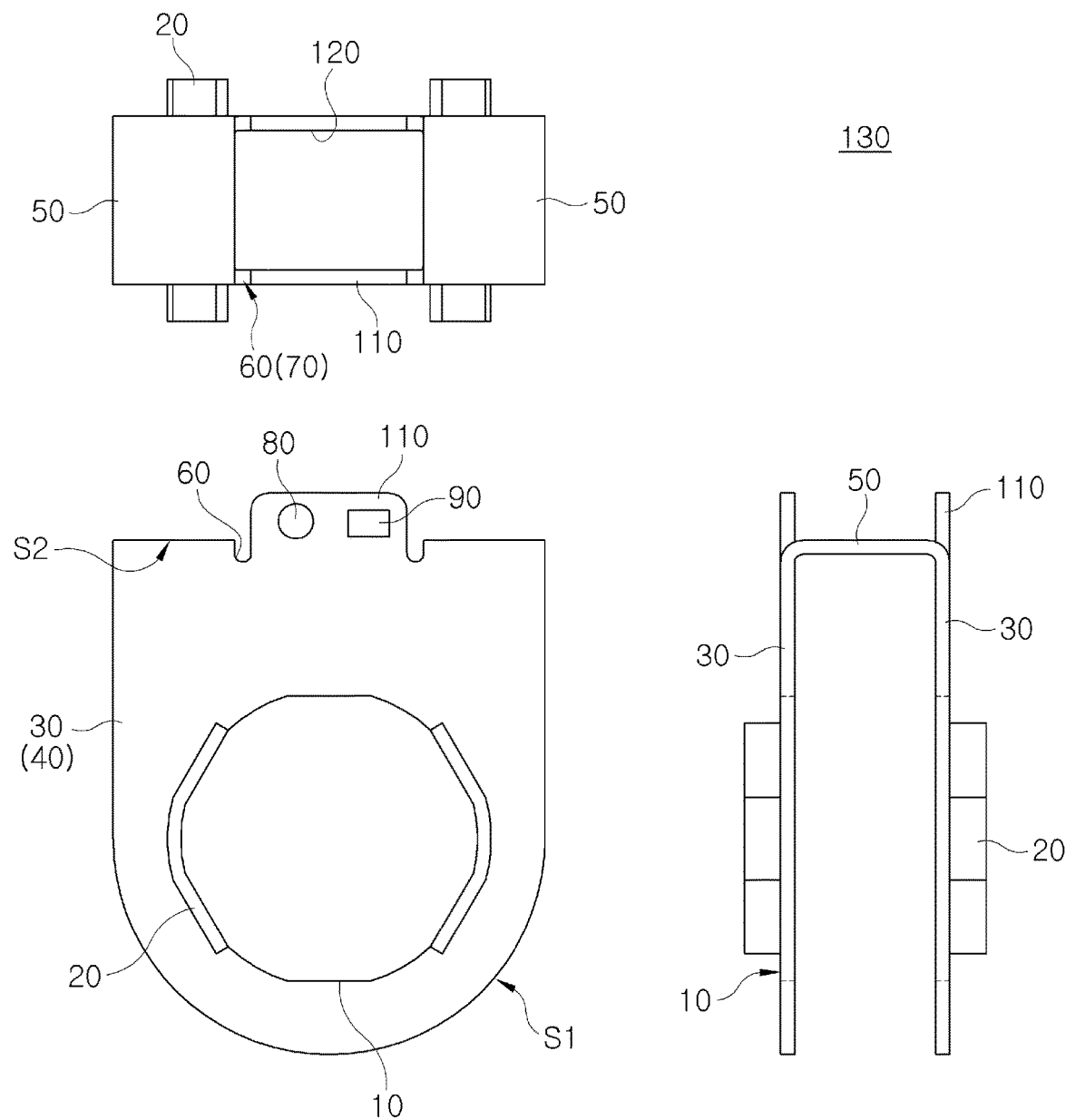
FIG. 2 shows views (a front view, a side view, and a top plan view) of a tube receiving module in the tube locking device for a fire suppression system of FIG. 1.

FIG. 1 shows views roughly showing a tube locking device for a fire suppression system according to a first embodiment of the present invention, and FIG. 2 shows views (a front view, a side view, and a top plan view) of a tube receiving module in the tube locking device for a fire suppression system of FIG. 1.

Figure 3:
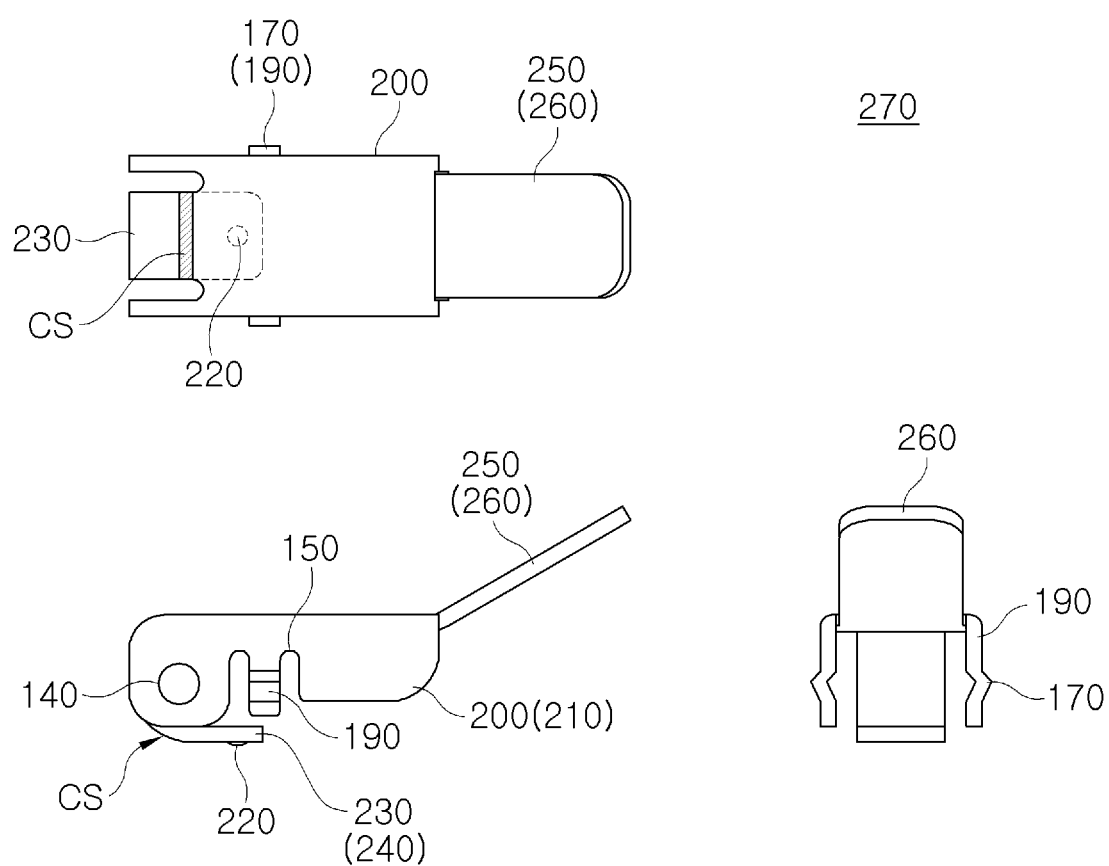
FIG. 3 shows views (a front view, a side view, and a top plan view) of a tube fastening module in the tube locking device for a fire suppression system of FIG. 1.
Figure 4:
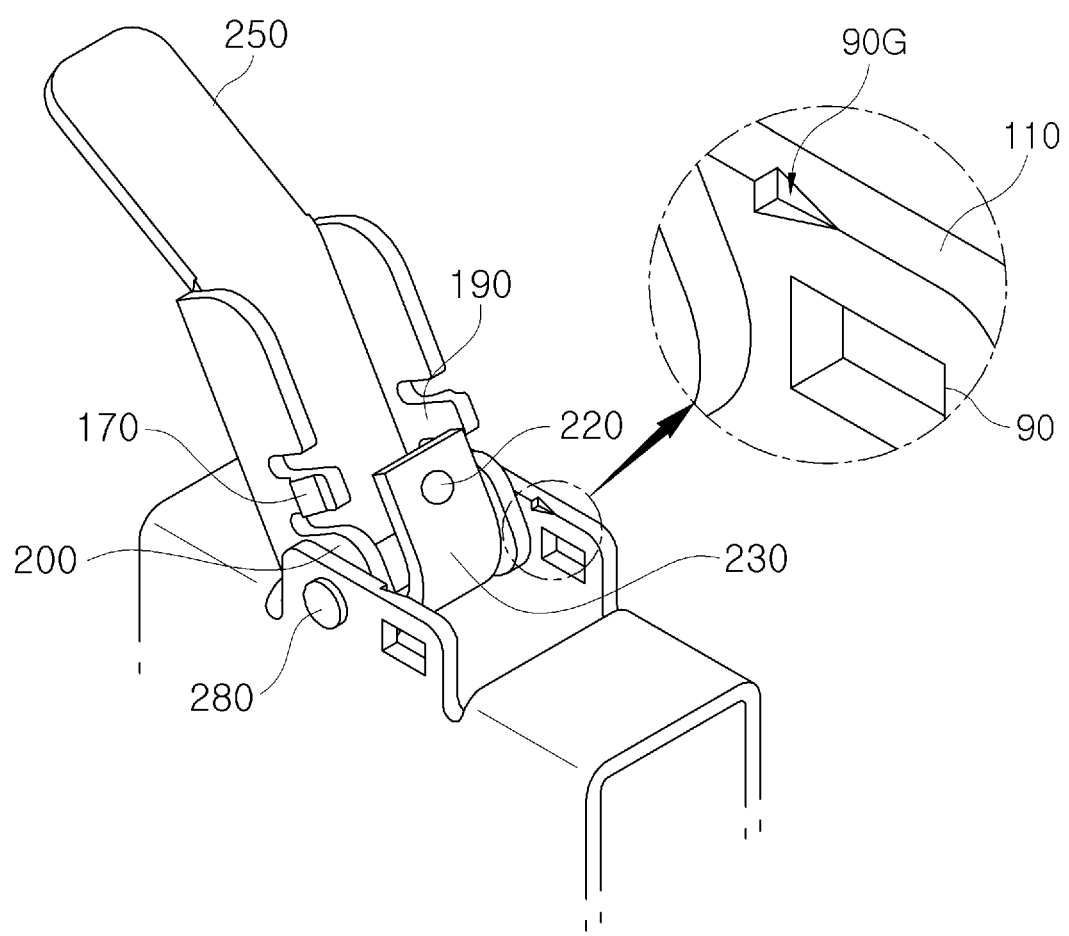
FIG. 4 is a perspective view partially showing the tube locking device for a fire suppression system of FIG. 1.

Furthermore, FIG. 3 shows views (a front view, a side view, and a top plan view) of a tube fastening module in the tube locking device for a fire suppression system of FIG. 1, FIG. 4 is a perspective view partially showing the tube locking device for a fire suppression system of FIG. 1.

Referring to FIGS. 1 to 4, the tube locking device for a fire suppression system 290 according to the first embodiment of the present invention includes the tube receiving module 130 and the tube fastening module 270. Here, the tube receiving module 130 and the tube fastening module 270 are combined with each other by a hinge pin 280, and the tube fastening module 270 rotates in a predetermined direction R around the hinge pin 280 relative to the tube receiving module 130.

First, the tube receiving module 130 has opposite tube receiving parts 40, connection parts 70, and rotation induction parts 110. Each of the tube receiving parts 40 is configured to have the same shape and be opposed to each other, and may be elastically vibrated in directions toward each other or in directions opposite to each other relative to the connection parts 70 by an external force.

The tube receiving parts 40 include opposite semielliptical plates 30 that have receiving holes 10 provided at predetermined areas of the semielliptical plates 30 and at least two wing pieces 20 provided in the vicinity of each of the receiving holes 10. The at least two wing pieces 20 surround the receiving hole 10. Each of the semielliptical plates 30 has a circular arc shape S1 provided on a first side edge thereof and a straight shape S2 provided on a second side edge thereof.

Figure 10:
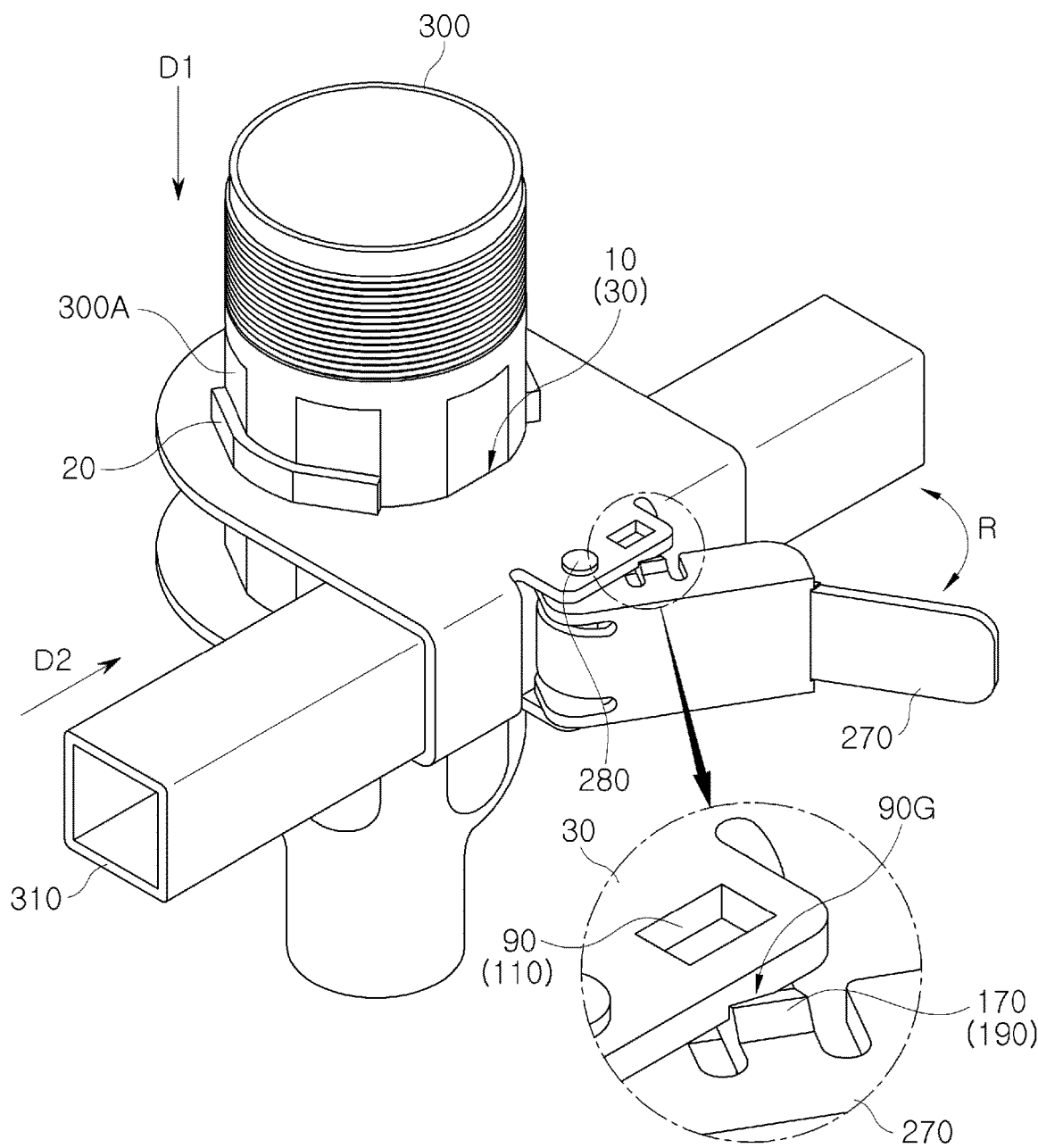

Here, as shown FIG. 10, the tube receiving parts 40 are passed through by a reducer 300 of FIG. 10 positioned at a flow path of fire suppression water in an inner part of a building (not shown), are fixed to the building, and sandwich a support tube 310 of FIG. 10 intersecting with the reducer 300 in the vicinity of the reducer 300.

To this end, the tube receiving parts 40 are connected to each other by the connection parts 70 protruding in parallel from opposite edges of the semielliptical plates 30 on the second side edges thereof. The receiving hole 10 of the semielliptical plate 30 has edges matching angular outer surfaces of a ring shape of the reducer 300 so as to insert the reducer 300 into the receiving hole.

The at least two wing pieces 20 protrude from the semielliptical plate 30 toward an outside of each of the tube receiving parts 40 from an inside thereof so as to prevent idle-rotating of the reducer 300 by being in contact with the reducer 300 inserted into the receiving hole 10. The two wing pieces 20 are bent so as to match the angular outer surfaces of a ring shape of the reducer 300.

Each of the connection parts 70 connects each of the tube receiving parts 40 on one side of each of the tube receiving parts 40. More particularly, the connection parts 70 include joining members 50 and isolation grooves 60. Each of the joining members 50 and each of the isolation grooves 60 extend or are provided in directions opposite to each other relative to the semielliptical plate 30.

The joining member 50 has a flat surface between the tube receiving parts 40 and is bent to be curved from each of the semielliptical plates 30 so as to give elasticity to the semielliptical plate 30. That is, the joining member 50 protrudes from one of the semielliptical plates 30, passes an area between the semielliptical plates 30, and is connected to the other one of the semielliptical plates 30. Each of the semielliptical plates 30 defines an insertion hole 120 in cooperation with the joining members 50.

The isolation groove 60 of each of the connection parts 70 extends from the second side edge of the semielliptical plate 30 toward the receiving hole 10 between each of the connection parts 70 and the rotation induction parts 110 so as to allow the movement of the rotation induction parts 110 independent from the connection parts 70. That is, when each of the tube receiving parts 40 is elastically vibrated, each of the rotation induction parts 110 may be free from each of the tube receiving parts 40 and the joining members 50 via the isolation grooves 60.

The rotation induction parts 110 protrude from the tube receiving parts 40 between the connection parts 70. More particularly, each of the rotation induction parts 110 includes a hinge hole 80 and a fixing hole 90 defined thereon between the connection parts 70.

Each of the rotation induction parts 110 constitutes the same surface as each of the tube receiving parts 40, and has a guide groove 90G of FIG. 4 provided above the fixing hole 90, the guide groove being open toward an area positioned between the rotation induction parts 110. The hinge hole 80 and the fixing hole 90 of each of the rotation induction parts 110 are positioned at levels higher than levels of the connection parts 70.

The hinge hole 80 of the rotation induction parts 110 is positioned at a level higher than a level of the fixing hole 90. Meanwhile, the tube fastening module 270 has a tunnel housing 210, a press part 240, and a handle part 260. The tunnel housing 210 is elastically fixed to the rotation induction parts 110 while rotating relative to the rotation induction parts 110.

When the tunnel housing 210 is elastically fixed to the rotation induction parts 110, the tunnel housing 210 includes a tunnel locking member 200 in a U shape so as to be open toward inner parts of the tube receiving parts 40. When the tunnel locking member 200 is elastically fixed to each of the rotation induction parts 110, the tunnel locking member 200 is exposed to each of the rotation induction parts 110 by intersecting with open directions of the hinge hole 80 and the fixing hole 90 of each of the rotation induction parts 110.

The tunnel locking member 200 includes a through hole 140 defined on each of opposite side walls thereof, the through hole 140 being arranged so as to correspond to the hinge hole 80 of each of the rotation induction parts 110. The tunnel locking member 200 and each of the rotation induction parts 110 are rotatably fixed to each other by the hinge pin 280 of FIG. 1 or FIG. 4 inserted into the through hole 140 and the hinge hole 80.

The tunnel locking member 200 includes: two separating grooves 150 defined on each of opposite side walls thereof in a direction perpendicular to a thickness direction of each of the opposite side walls; and a corrugated finishing member 190 arranged between the two separating grooves 150 on each of the opposite side walls so as to be combined with the fixing hole 90 of each of the rotation induction parts 110. The two separating grooves 150 allow a movement of the corrugated finishing member 190 independent from each of the tunnel locking member 200.

Furthermore, the corrugated finishing member 190 includes a corrugated protrusion 170 provided thereon by protruding from the corrugated finishing member toward each of the rotation induction parts 110, the corrugated protrusion being inserted into the guide groove 90G of each of the rotation induction parts 110 and sliding along each of the rotation induction parts 110 from the guide groove 90G toward the fixing hole 90 so as to be elastically fixed to the fixing hole 90.

The press part 240 protrudes from a first end part of the tunnel housing 210. More particularly, the press part 240 is positioned between opposite side walls of the tunnel locking member 200.

That is, when the tunnel locking member 200 is elastically fixed to each of the rotation induction parts 110, the press part 240 includes a press piece 230 provided thereon in such a manner that the press piece 230 protrudes from an upper side of a first side tunnel entrance of the tunnel locking member 200, surrounds the first side tunnel entrance, is bent toward a lower side of the first side tunnel entrance, and is exposed to the lower side of the first side tunnel entrance.

Figure 11:
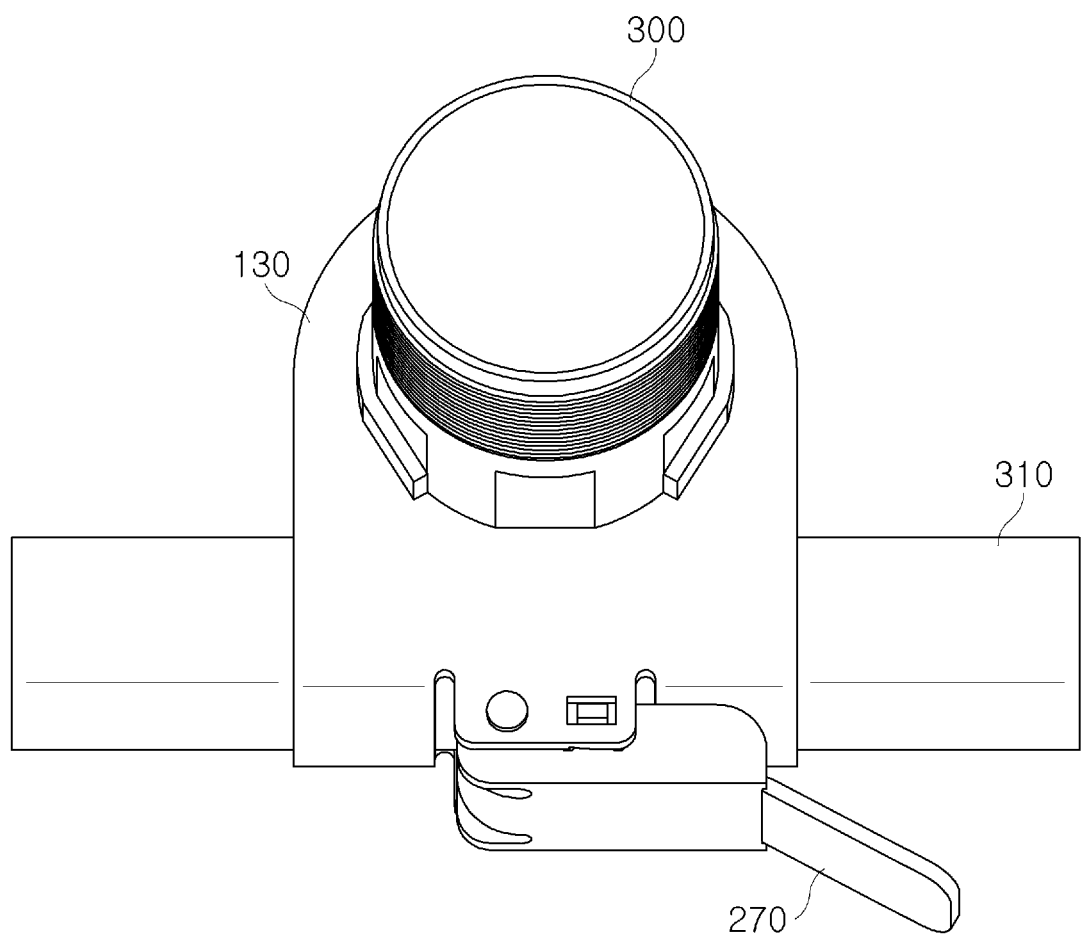

The press piece 230 vibrates elastically through the lower side of the tunnel locking member 200 between the opposite side walls of the tunnel locking member 200. The press piece 230 has the press protrusion 220 provided on a surface opposite to a surface facing an inner part of the tunnel locking member 200. Referring to FIGS. 4, 10, and 11, when the tunnel locking member 200 is elastically fixed to each of the rotation induction parts 110, the press piece 230 passes the insertion hole 120 positioned between the rotation induction parts 110 under the tunnel locking member 200.

Here, as shown in FIG. 10, when the tunnel locking member 200 is elastically fixed to each of the rotation induction parts 110, the press part 240 presses the support tube 310 by the press protrusion 220 of the press piece 230 in the insertion hole 120 positioned between the rotation induction parts 110. Accordingly, as shown in FIG. 11, when the tunnel housing 210 is elastically fixed to the rotation induction parts 110, the press part 240 may bring the support tube 310 into close contact with the reducer 300 by elastically pushing the support tube 310 toward the reducer 300 in the vicinity of the rotation induction parts 110, for example, between the rotation induction parts 110.

More particularly, when the press piece 230 is brought into close contact with the support tube 310, the press piece 230 is slanted between a press surface CS and the press protrusion 220 so as to push the support tube 310 by the press surface CS and the press protrusion 220. The press surface CS and the press protrusion 220 may allow the support tube 310 to sit on one angular surface 300A of FIG. 10 of the angular outer surfaces of a ring shape of the reducer 300.

The handle part 260 protrudes from a second end part of the tunnel housing 210. More particularly, the handle part 260 includes a pushing member 250 provided thereon by protruding slantingly from an upper side of a second side tunnel entrance of the tunnel locking member 200. When the tunnel locking member 200 is elastically fixed to each of the rotation induction parts 110, the pushing member 250 receives a force from an outside and applies the force to the tunnel locking member 200 and the press piece 230.

The pushing member 250 is positioned farther from the hinge pin 280 than the tunnel locking member 200 and protrudes slantingly to the tunnel locking member 200 therefrom, and thus may elastically fix the tunnel locking member 200 to a guide member 100 by a force less than an external force applied directly to the tunnel locking member 200.

Figure 5:
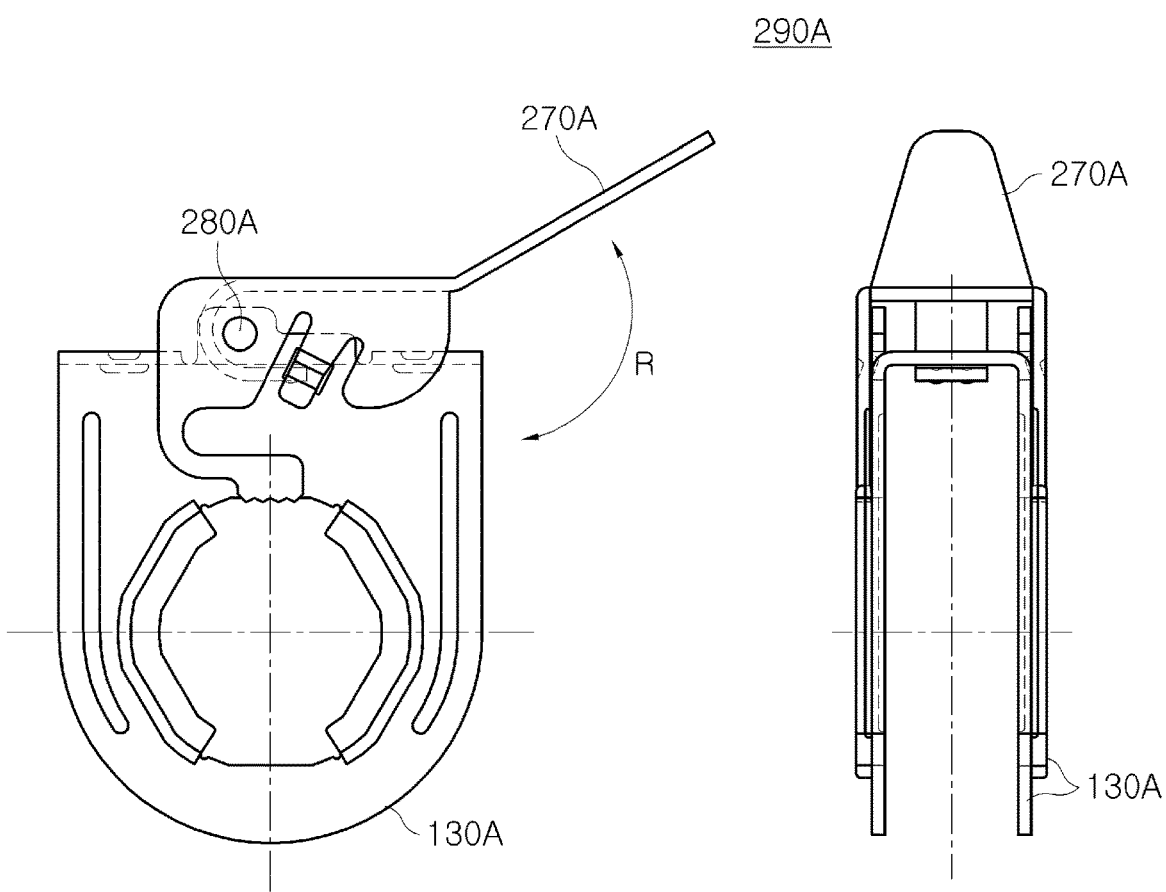
FIG. 5 shows views roughly showing a tube locking device for a fire suppression system according to a second embodiment of the present invention.
Figure 6:
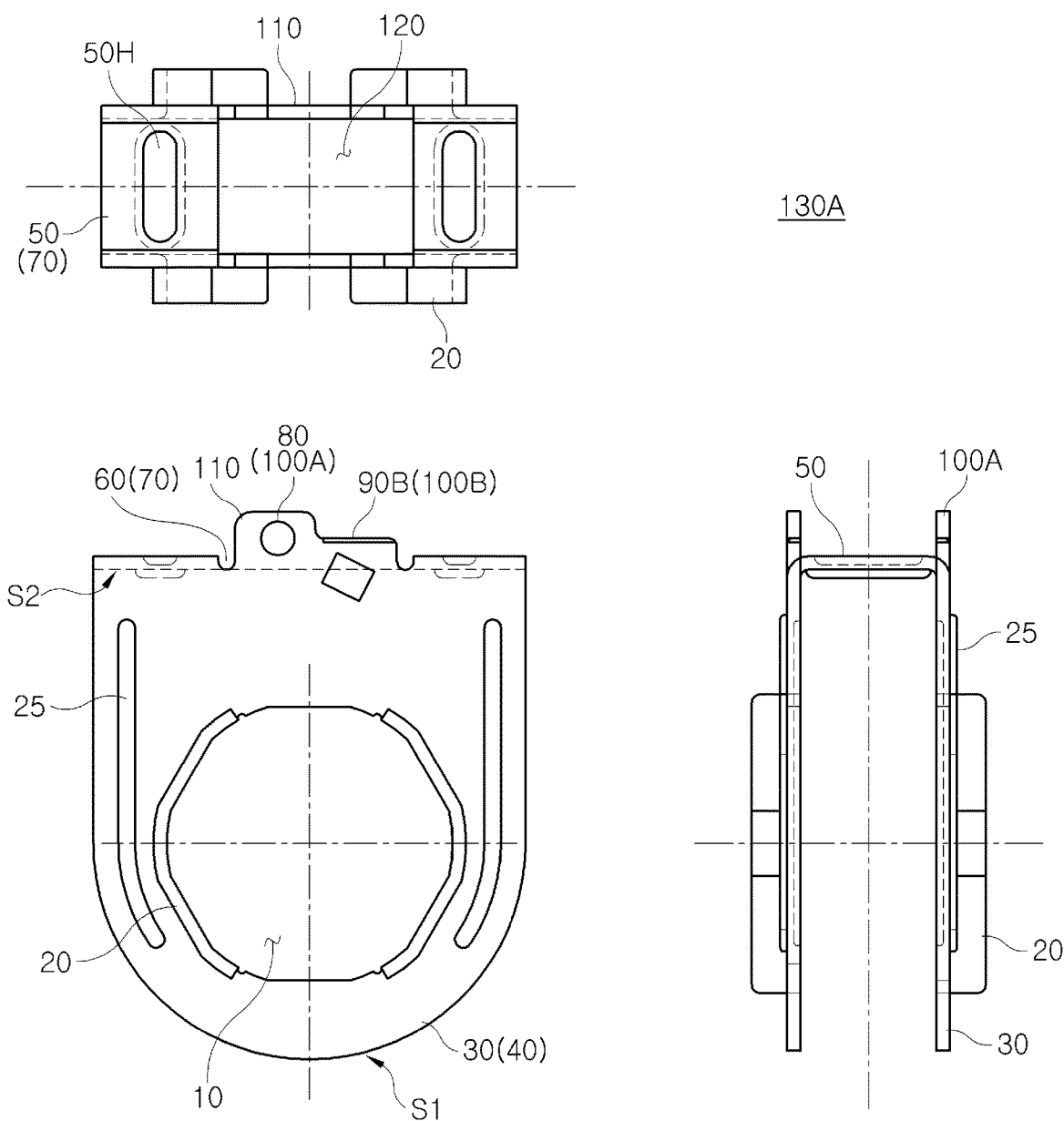
FIG. 6 shows views (a front view, a side view, and a top plan view) of a tube receiving module in the tube locking device for a fire suppression system of FIG. 5.

FIG. 5 is a front view roughly showing a tube locking device for a fire suppression system according to a second embodiment of the present invention, and FIG. 6 shows views (a front view, a side view, and a top plan view) of a tube receiving module in the tube locking device for a fire suppression system of FIG. 5.

Figure 7:
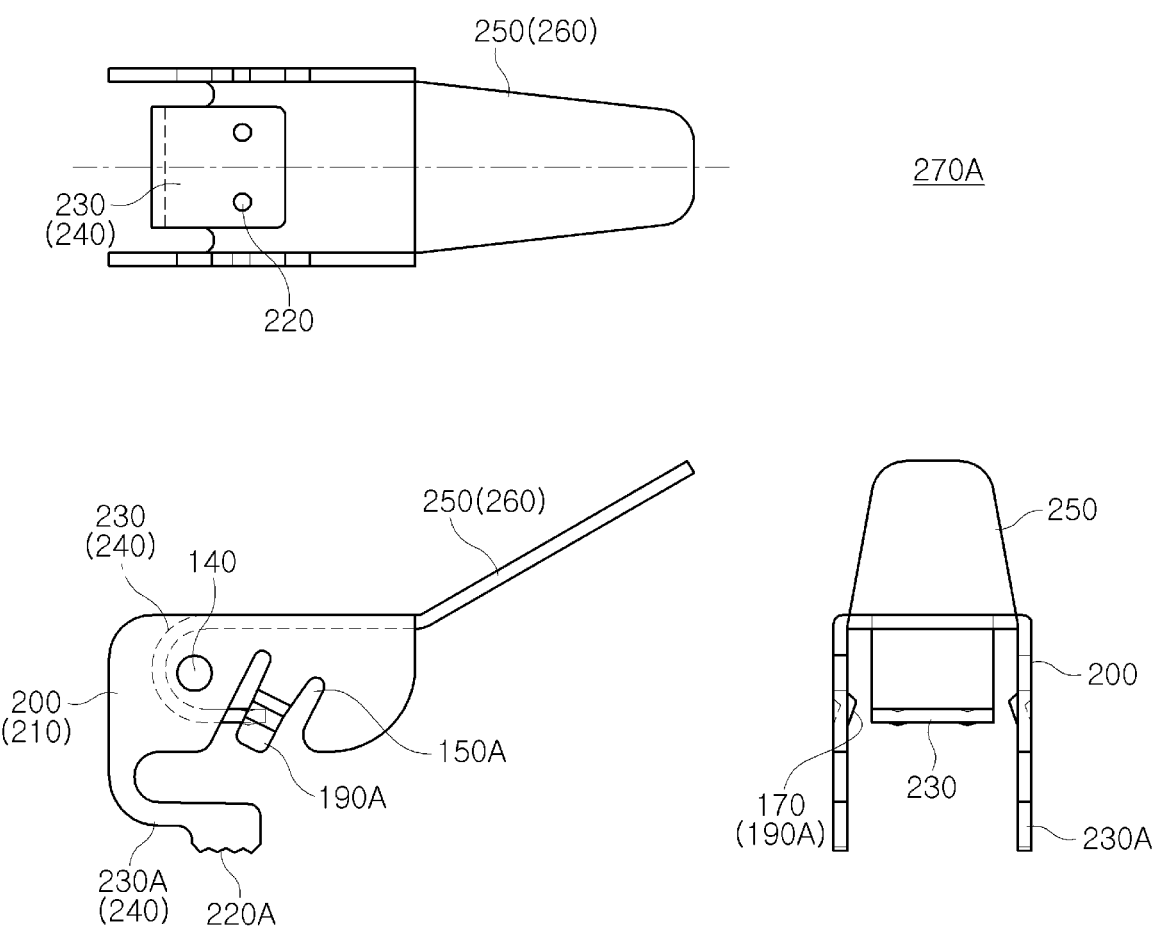
FIG. 7 shows views (a front view, a side view, and a rear view) of a tube fastening module in the tube locking device for a fire suppression system of FIG. 5.
Figure 8:
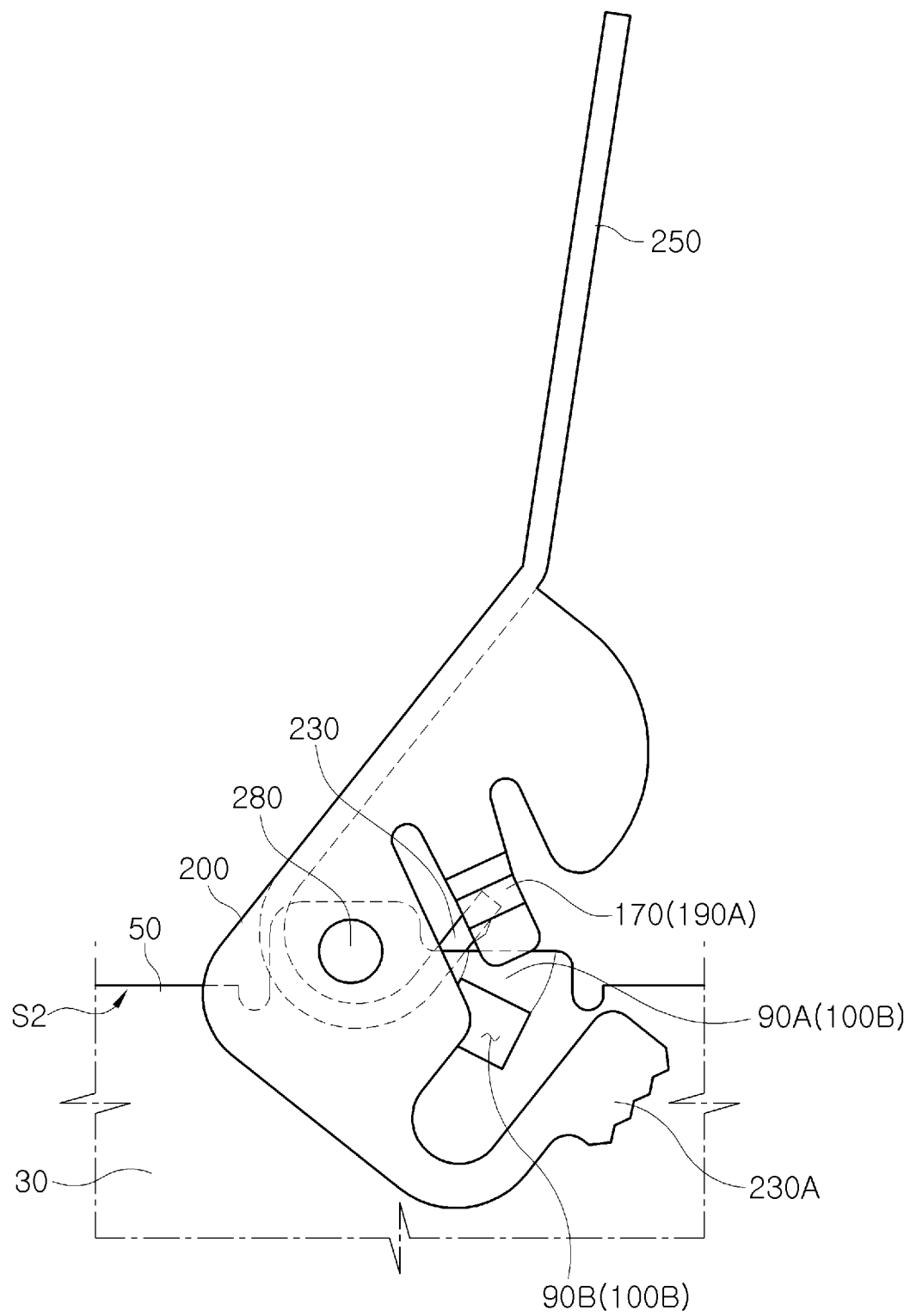
FIG. 8 is a front view partially showing the tube locking device for a fire suppression system of FIG. 5.

In addition, FIG. 7 shows views (a front view, a side view, and a rear view) of a tube fastening module in the tube locking device for a fire suppression system of FIG. 5, and FIG. 8 is a front view partially showing the tube locking device for a fire suppression system of FIG. 1.

Referring to FIGS. 5 to 8, the tube locking device for a fire suppression system 290A according to a second embodiment of the present invention has a structure similar to a structure of the tube locking device for a fire suppression system 290 of FIGS. 1 to 4, but when examined closely, the tube receiving module 130A of FIG. 6 and the tube fastening module 270A of FIG. of the tube locking device 290A have structures slightly different from structures of the tube receiving module 130 of FIG. 2 and the tube fastening module 270 of FIG. 3 of the tube locking device 290 as described hereinafter.

First, as shown in FIG. 6, the tube receiving module 130A includes the opposite tube receiving parts 40, connection parts 70, and the rotation induction parts. Each of the tube receiving parts 40 has the semielliptical plate 30. Each of the semielliptical plates 30 has a receiving hole 10 and the two wing pieces 20 or more. Here, as shown in FIG. 6, the semielliptical plate 30 has surface-elasticity-maintaining grooves 25 positioned on opposite sides of the receiving hole 10.

The surface-elasticity-maintaining grooves 25 may extend in predetermined widths from the opposite sides of the receiving hole 10 toward the straight shape S2 of the semielliptical plate 30 and may protrude from an inner circumferential surface of the semielliptical plate 30 toward an outer circumferential surface thereof. Each of the connection parts 70 has the joining member 50 and the isolation groove 60. Here, as shown in FIG. 6, the joining member 50 includes an elasticity operation hole 50H defined between the tube receiving parts 40 so as to give elasticity to the tube receiving parts 40.

As shown in FIG. 6, each of the rotation induction parts 110 includes a locking part 100B and a hinge part 100A provided thereon between the connection parts 70. The locking part 100B and the hinge part 100A include a locking hole 90B and the hinge hole 80 defined respectively thereon. The locking part 100B protrudes vertically from the straight shape S2 of the semielliptical plate 30 to an outside of the semielliptical plate 30.

The locking part 100B includes a sliding groove 90A provided on an upper side thereof and the locking hole 90B provided on a lower side thereof. The sliding groove 90A and the locking hole 90B are slanted relative to the straight shape S2 of the semielliptical plate 30. The locking hole 90B of the locking part 100B extends from the locking part 100B to the semielliptical plate 30.

The hinge part 100A protrudes vertically from the straight shape S2 of the semielliptical plate 30 to the outside of the semielliptical plate 30 and is higher than the locking part 100B relative to the straight shape S2 of the semielliptical plate 30. Meanwhile, as shown in FIG. 7, the tube fastening module 270A includes a tunnel housing 210, a press part 240, and a handle part 260.

As shown FIG. 7, when the tunnel housing 210 is elastically fixed to the rotation induction parts 110, the tunnel housing 210 includes a tunnel locking member 200 in a U shape so as to be open toward the tube receiving parts 40. When the tunnel locking member 200 is elastically fixed to each of the rotation induction parts 110, the tunnel locking member 200 is exposed to each of the rotation induction parts 110 by intersecting with open directions of the hinge hole 80 and the locking hole 90B of each of the rotation induction parts 110.

Referring to FIGS. 6 to 8, while passing an insertion hole 120 between the tube receiving parts 40, the tunnel locking member 200 covers the locking part 100B and the hinge part 100A and is opened toward the locking part 100B and the hinge part 100A, and includes the through hole 140 defined on the outer circumferential surface of the semielliptical plate 30, the through hole 140 being combined with the hinge hole 80 of the hinge part 100A by a hinge pin 280 of FIG. 8.

The tunnel locking member 200 includes the two separating grooves 150A defined slantingly on each of the opposite side walls in a direction perpendicular to a thickness direction thereof, and a corrugated finishing member 190A provided on each of the opposite side walls between the two separating grooves 150A, the corrugated finishing member 190A passing the sliding groove 90A of the locking part 100B on the outer circumferential surface of the semielliptical plate 30 and being combined with the locking hole 90B positioned under the sliding groove 90A.

As shown in FIG. 7, when the locking part 100B and the tunnel locking member 200 are combined with each other, the corrugated finishing member 190A covers the sliding groove 90A and the locking hole 90B, is slanted relative to the straight shape S2 of the semielliptical plate 30, and allows the corrugated protrusion 170 to be inserted into the locking hole 90B. As shown in FIG. 7, the press part 240 includes a first press piece 230 and a second press piece 230A. As shown in FIG. 5 or FIG. 8, the first press piece 230 and the second press piece 230A face the outer circumferential surface and the inner circumferential surface of the semielliptical plate 30 respectively.

As shown in FIG. 7, the second press piece 230A is positioned to be spaced apart from the receiving hole of the semielliptical plate 30 or to be adjacent thereto by a relative rotation of the tunnel housing 210 relative to the hinge part 100A, wherein when the second press piece is spaced apart from the receiving hole 10 of the semielliptical plate 30, the second press piece moves toward the locking part 100B so as to be adjacent to the locking part 100B, and when the second press piece is positioned to be adjacent to the receiving hole 10 of the semielliptical plate 30, the tunnel housing 210 is combined with the locking part 100B.

Figure 12:
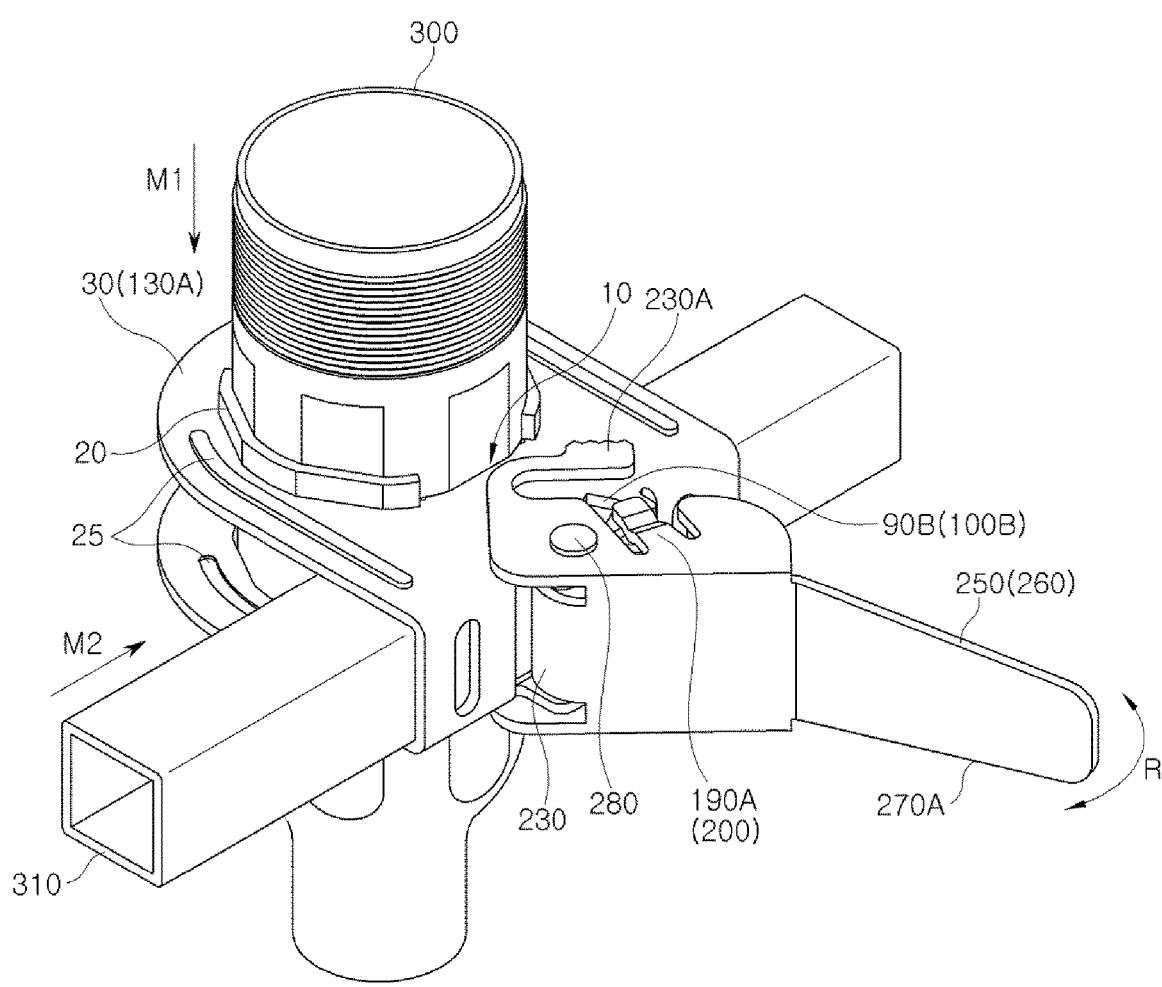
FIGS. 12 and 13 are views describing how to use the tube locking device for a fire suppression system of FIG. 5.
Figure 13:
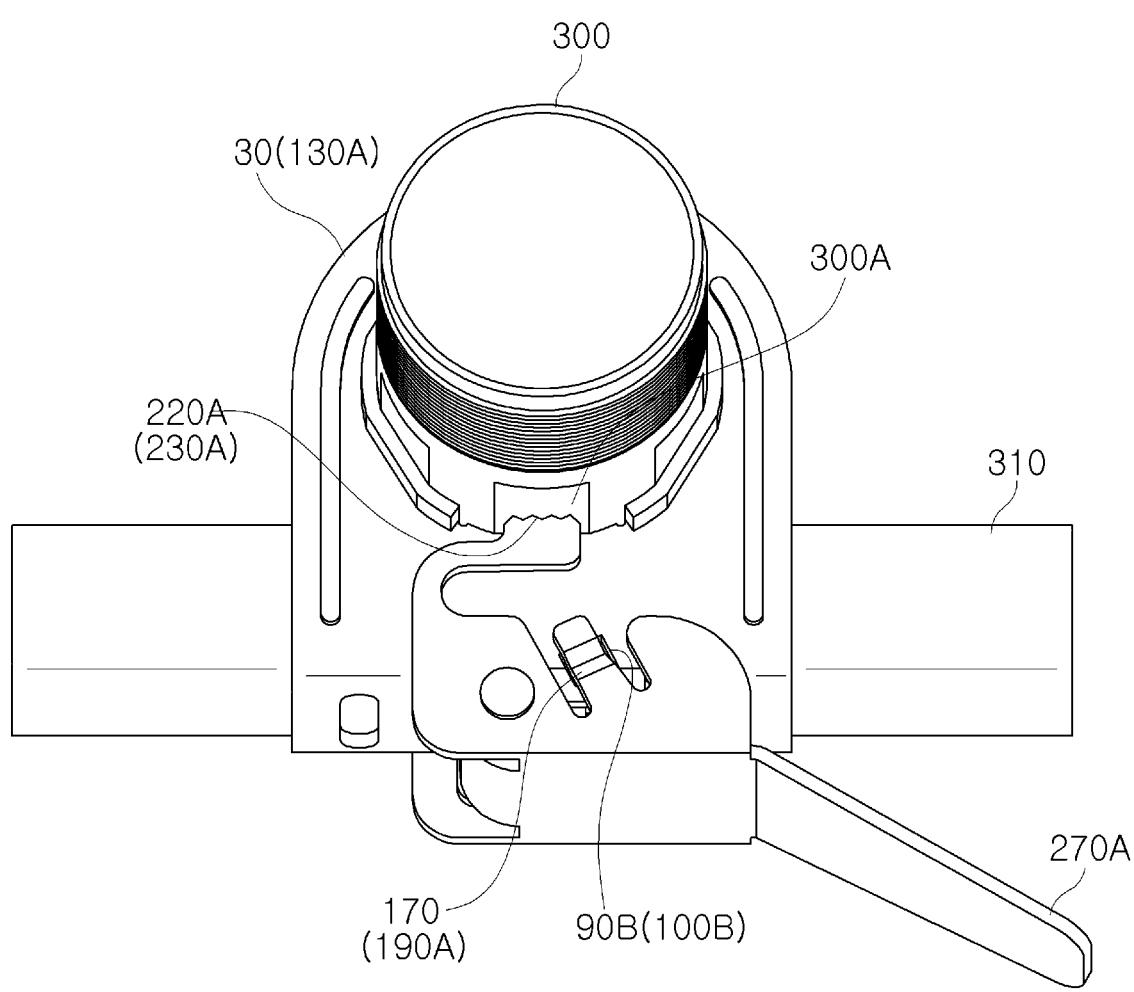

After the locking part 100B and the tunnel housing 210 are combined with each other, the second press piece 230A extending horizontally along a lower part of the tunnel locking member 200 so as to have an arm shape after protruding vertically from an edge of a first side of the tunnel locking member 200 toward the receiving hole 10 of the semielliptical plate 30 exposes a corrugated surface 220A of the second press piece to an entrance of the receiving hole 10 of the semielliptical plate 30 and contacts with the reducer 300 of FIG. 12 or FIG. 13 positioned in the receiving hole of the semielliptical plate via the corrugated surface.

As shown in FIG. 7, after the locking part 100B and the tunnel housing 210 are combined with each other, the first press piece 230 is configured to be integrated with the tunnel locking member 200 between the tube receiving parts 40. The first press piece 230 protrudes from a ceiling of the tunnel locking member 200, is bent to have a round shape in the vicinity of the hinge part 100A, extends horizontally toward the locking part 100B, exposes the press protrusion 220 toward the receiving hole 10 of the semielliptical plate 30 in the vicinity of the locking part 100B and the hinge part 100A, and contacts with the support tube 310 of FIG. 12 or FIG. 13 positioned in the vicinity of the receiving hole 10 of the semielliptical plate 30 via the press protrusion 220. The handle part 260 has the same shape and function as the handle part 260 of FIG. 3.

Figure 9:
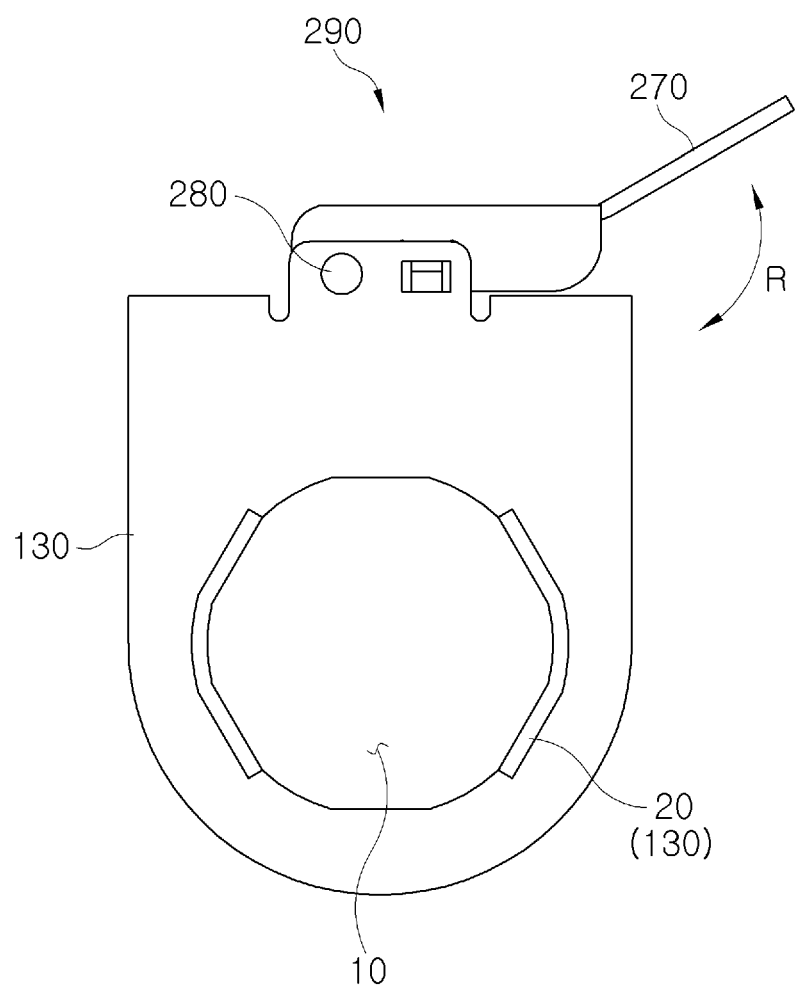
FIGS. 9 to 11 are views describing how to use the tube locking device for a fire suppression system of FIG. 1.

FIGS. 9 to 11 are views describing how to use the tube locking device for a fire suppression system of FIG. 1, and FIGS. 12 and 13 are views describing how to use the tube locking device for a fire suppression system of FIG. 5.

To connect a sprinkler (not shown) to a fire suppression pipe (not shown) along the fire suppression pipe in a building, the tube locking device for a fire suppression system 290, 290A, the reducer 300, and the support tube 310 may be provided. The tube locking device for a fire suppression system 290, 290A may be configured to insert the hinge pin 280 into the tube receiving module 130, 130A and the tube fastening module 270, 270A so as to rotate the tube fastening module 270, 270A relative to the tube receiving module 130, 130A.

When the insertion hole 120 of FIG. 2 or FIG. 6 of the tube receiving module 130, 130A is opened by the tube fastening module 270, 270A (see FIG. 10 or FIG. 12), the reducer 300 may be inserted into the receiving hole 10 defined on each of the opposite semielliptical plates 30 of the tube receiving module 130, 130A in a first direction D1, M1. While the reducer 300 is being inserted into the semielliptical plates 30, the angular outer surfaces 300A of a ring shape of the reducer 300 may match edges of the receiving hole 10 and the wing pieces 20 positioned in the vicinity of the receiving hole 10.

The support tube 310 may be inserted between the semielliptical plates 30 of the tube receiving modules 130, 130A in a second direction D2, M2. Here, the support tube 310 may be inserted between the semielliptical plates 30 earlier than the reducer 300. When the tube fastening module 270, 270A rotates in a predetermined direction R relative to the tube receiving module 130, 130A after the support tube 310 is inserted into the tube receiving module 130, 130A, the insertion hole 120 of the tube receiving module 130, 130A may be closed by the tube fastening module 270, 270A (see FIG. 11 or FIG. 13).

To change the state of the insertion hole 120 of the tube receiving module 130, 130A from an open state thereof to a closed state thereof, the tube fastening module 270, 270A may rotate the tunnel locking member 200 of FIG. 4 or FIG. 8 around the hinge pin 280 passing through the rotation induction parts 110 of FIG. 2, FIG. 4, or FIG. 6 of the tube receiving module 130, 130A.

While the tunnel locking member 200 is rotating between the rotation induction parts 110, the tunnel locking member 200 allows the corrugated protrusion 170 of the corrugated finishing member 190, 190A to be inserted into the guide groove 90G or the sliding groove 90A of each of the rotation induction parts 110, the corrugated protrusion 170 to slide along each of the rotation induction parts 110, and the corrugated protrusion 170 to be elastically fixed to the fixing hole 90 or the locking hole 90B of each of the rotation induction parts 110.

Here, while the tunnel locking member 200 is sliding along each of the rotation induction parts 110, each of the rotation induction parts 110 and the corrugated finishing member 190, 190A operate as a spring by pushing each other and being pushed thereby to be pressed by each other and may insert the corrugated protrusion 170 into the fixing hole 90 or the locking hole 90B.

What is claimed is:
1. A tube locking device for a fire suppression system, the tube locking device comprising:
 a tube receiving module including tube receiving parts facing each other, connection parts provided on sides of the tube receiving parts so as to connect the tube receiving parts, and rotation induction parts provided between the connection parts, extending in a substan- tially same plane in which the tube receiving parts extend and protruding from the tube receiving parts; and a tube fastening module including a tunnel housing provided between the rotation induction parts, the tunnel housing being elastically fixed to the rotation induction parts while rotating relative to the rotation induction parts, a press part protruding from a first end part of the tunnel housing and elastically connected to the first end part of the tunnel housing, and a handle part protruding from a second end part of the tunnel housing, wherein:

the tube receiving parts are configured to be passed through by a reducer positioned at a flow path of fire suppression water in an inner part of a building, are configured to be fixed to the building, and are configured to sandwich a support tube intersecting with the reducer in the vicinity of the reducer, when the tunnel housing is elastically fixed to the rotation induction parts, the press part brings the support tube into close contact with the reducer by pushing the support tube elastically toward the reducer in the vicinity of the rotation induction parts, and the tube receiving parts include opposite plates, each plate having a receiving hole provided at a predetermined area of the plate and at least two wing pieces provided in the vicinity of the receiving hole, wherein the at least two wing pieces are adjacent to the receiving hole.

2. The tube locking device of claim 1, wherein each of the plates has a semielliptical shape.

3. The tube locking device of claim 2, wherein each said plate has a circular arc shape provided on a first side edge thereof and a straight shape provided on a second side edge thereof, wherein the tube receiving parts are connected to each other by the connection parts protruding in parallel from the respective second side edges of the plates.

4. The tube locking device of claim 1, wherein the receiving hole of each said plate has edges matching angular outer surfaces of a ring shape of the reducer to enable insertion of the reducer into the receiving hole.

5. The tube locking device of claim 1, wherein the at least two wing pieces protrude from each said plate toward an outside of each of the tube receiving parts from an inside thereof so as to prevent an idle-rotating of the reducer by being in contact with the reducer inserted into the receiving hole.

6. The tube locking device of claim 1, wherein each said plate further includes surface-elasticity-maintaining grooves positioned on opposite sides of the receiving hole, wherein the surface-elasticity-maintaining grooves extend in predetermined widths from the opposite sides of the receiving hole toward a straight shape of the plate and protrude from an inner circumferential surface of the plate toward an outer circumferential surface thereof.

7. The tube locking device of claim 1, wherein each of the connection parts includes a joining member and an isolation groove, wherein the joining member and the isolation groove extend or are provided in different directions from each other relative to the semielliptical plate.

8. The tube locking device of claim 7, wherein the joining member has a flat surface between the tube receiving parts and is bent to be curved from each said plate so as to give elasticity to the plates.

9. The tube locking device of claim 8, wherein the joining member includes an elasticity operation hole defined between the tube receiving parts so as to give elasticity to the tube receiving parts.

10. The tube locking device of claim 7, wherein the isolation groove of each of the connection parts extends from the second side edge of the plate toward the receiving hole between each of the connection parts and the rotation induction parts so as to allow movement of the rotation induction parts independent of the connection parts.

11. The tube locking device of claim 1, wherein each of the rotation induction parts includes a hinge hole and a fixing hole defined thereon between the connection parts, constitutes the same surface as each of the tube receiving parts, and has a guide groove provided above the fixing hole, the guide groove being open toward an area positioned between the rotation induction parts.

12. The tube locking device of claim 11, wherein the hinge hole and the fixing hole of each of the rotation induction parts are positioned at levels higher than levels of the connection parts.

13. The tube locking device of claim 11, wherein an uppermost portion of the hinge hole of each of the rotation induction parts is positioned at a level higher than a level of an uppermost portion of the fixing hole.

14. The tube locking device of claim 1, wherein each of the rotation induction parts includes a locking part and a hinge part provided thereon between the connection parts, wherein the locking part includes a locking hole and the hinge part includes a hinge hole.

15. The tube locking device of claim 14, wherein each locking part protrudes vertically from a straight shape of one of the plates to an outside of the plate.

16. The tube locking device of claim 14, wherein each locking part includes a sliding groove provided on an upper side thereof and the locking hole provided on a lower side thereof, wherein each sliding groove and each locking hole are slanted relative to a straight shape of one of the plates, and the locking hole of the locking part extends from the locking part to the plate.

17. The tube locking device of claim 14, wherein each hinge part protrudes vertically from a straight shape of one of the plates to the outside of the plate and is higher than the locking part relative to the straight shape of the plate.

18. The tube locking device of claim 11, wherein, when the tunnel housing is elastically fixed to the rotation induction parts, the tunnel housing includes a tunnel locking member in a U-shape so as to be open toward inner parts of the tube receiving parts, wherein, when the tunnel locking member is elastically fixed to each of the rotation induction parts, at least a part of the tunnel locking member is inserted into the fixing hole of each of the rotation induction parts so as to be exposed to each of the rotation induction parts.

19. The tube locking device of claim 18, wherein the tunnel locking member includes a through hole defined on each of opposite side walls thereof, each through hole being arranged so as to be associated with the hinge hole of one of the rotation induction parts, wherein the tunnel locking member and each of the rotation induction parts are rotatably fixed to each other by a hinge pin inserted into the through hole and the hinge hole.

20. The tube locking device of claim 18, wherein the tunnel locking member includes:

two separating grooves defined on each of opposite side walls thereof in a direction perpendicular to a thickness direction of each of the opposite side walls; and a corrugated finishing member arranged between the two separating grooves on each of the opposite side walls so as to engage with the fixing hole of each of the rotation induction parts, wherein the corrugated finishing member includes a corrugated protrusion provided thereon by protruding from the corrugated finishing member toward each of the rotation induction parts, the corrugated protrusion being inserted into the guide groove of each of the rotation induction parts and sliding along each of the rotation induction parts from the guide groove toward the fixing hole so as to be elastically fixed to the fixing hole.

21. The tube locking device of claim 16, wherein, when the tunnel housing is elastically fixed to the rotation induction parts, the tunnel housing includes a tunnel locking member in a U-shape so as to be open toward the tube receiving parts, wherein, when the tunnel locking member is elastically fixed to each of the rotation induction parts, at least a part of the tunnel locking member is inserted into the locking hole of each of the rotation induction parts so as to be exposed to each of the rotation induction parts.

22. The tube locking device of claim 21, wherein the tunnel locking member includes a through hole defined thereon, wherein, when the tunnel locking member covers the locking part and the hinge part and is open toward the locking part and the hinge part, the through hole is combined with the hinge hole of the hinge part on an outer circumferential surface of the plate by a hinge pin.

23. The tube locking device of claim 21, wherein the tunnel locking member includes:

two separating grooves defined slantingly on each of opposite side walls thereof in a direction perpendicular to a thickness direction of each of the opposite side walls; and a corrugated finishing member arranged between the two separating grooves, the corrugated finishing member passing the sliding groove of the locking part on an outer circumferential surface of the plate and being combined with the locking hole positioned under the sliding groove, wherein, when the locking part and the tunnel locking member are combined with each other, the corrugated finishing member covers the sliding groove and the locking hole, is slanted to the straight shape of the plate, and allows a corrugated protrusion to be inserted into the locking hole.

24. The tube locking device of claim 18, wherein the press part includes a press piece provided thereon in such a manner that the press piece protrudes from an upper side of a first side tunnel entrance of the tunnel locking member, surrounds the first side tunnel entrance, is bent toward a lower side of the first side tunnel entrance, and is exposed to the lower side of the first side tunnel entrance, wherein, when the tunnel locking member is elastically fixed to each of the rotation induction parts, the press piece vibrates elastically through the lower side of the tunnel locking member between opposite side walls of the tunnel locking member.

25. The tube locking device of claim 24, wherein the press piece has a press protrusion provided on a surface opposite to a surface facing an inner part of the tunnel locking member, wherein, when the tunnel locking member is elastically fixed to each of the rotation induction parts, the press part presses the support tube between the rotation induction parts via the press protrusion of the press piece.

26. The tube locking device of claim 21, wherein the press part includes a first press piece and a second press piece, wherein the first press piece and the second press piece face an outer circumferential surface and an inner circumferential surface of the plate respectively.

27. The tube locking device of claim 26, wherein the second press piece is positioned to be spaced apart from the receiving hole of each said plate or to be adjacent thereto by a relative rotation of the tunnel housing relative to the hinge part, wherein, when the second press piece is spaced apart from the receiving hole of each said plate, the second press piece moves toward the locking part so as to be adjacent thereto, and when the second press piece is positioned to be adjacent to the receiving hole of each said plate, the tunnel housing is combined with the locking part.

28. The tube locking device of claim 26, wherein, after the locking part and the tunnel housing are combined with each other, the second press piece extending horizontally along a lower part of the tunnel locking member so as to have an arm shape after protruding vertically from an edge of a first side of the tunnel locking member toward the receiving hole of each said plate exposes a corrugated surface of the second press piece to an entrance of the receiving hole of each said plate and contacts with the reducer positioned in the receiving hole of the plate via the corrugated surface.

29. The tube locking device of claim 26, wherein, after the locking part and the tunnel housing are combined with each other, the first press piece is configured to be integrated with the tunnel locking member between the tube receiving parts, wherein the first press piece protrudes from a ceiling of the tunnel locking member, is bent to have a round shape in the vicinity of the hinge part, extends horizontally toward the locking part, exposes a press protrusion toward the receiving hole of each said plate in the vicinity of the locking part and the hinge part, and contacts with the support tube positioned in the vicinity of the receiving hole of each said plate via the press protrusion.

30. The tube locking device of claim 21, wherein the handle part includes a pushing member provided thereon by protruding slantingly from an upper side of a second side tunnel entrance of the tunnel locking member, wherein, when the tunnel locking member is elastically fixed to each of the rotation induction parts, the pushing member receives a force from outside and applies the force to the tunnel locking member and a press piece.

31. The tube locking device of claim 18, wherein the handle part includes a pushing member provided thereon by protruding slantingly from an upper side of a second side tunnel entrance of the tunnel locking member, wherein, when the tunnel locking member is elastically fixed to each of the rotation induction parts, the pushing member receives a force from outside and applies the force to the tunnel locking member and a press piece.

32. A tube locking device for a fire suppression system, the tube locking device comprising:

a tube receiving module including opposite tube receiving parts facing each other, connection parts provided on sides of the tube receiving parts so as to connect the tube receiving parts, and rotation induction parts provided between the connection parts by protruding from the tube receiving parts, wherein the tube receiving parts include opposite semielliptical plates, each having a receiving hole provided at a predetermined area of the semielliptical plate and at least two wing pieces provided in the vicinity of the receiving hole, wherein the at least two wing pieces are adjacent to the receiving hole; and a tube fastening module including a tunnel housing provided between the rotation induction parts, the tunnel housing being elastically fixed to the rotation induction parts while rotating relative to the rotation induction parts, a press part protruding from a first end part of the tunnel housing, and a handle part protruding from a second end part of the tunnel housing, wherein the tube receiving parts are configured to be passed through by a reducer positioned at a flow path of fire suppression water in an inner part of a building, are configured to be fixed to the building, and are configured to sandwich a support tube intersecting with the reducer in the vicinity of the reducer, and when the tunnel housing is elastically fixed to the rotation induction parts, the press part brings the support tube into close contact with the reducer by pushing the support tube elastically toward the reducer in the vicinity of the rotation induction parts.

* * * * *